(12) United States Patent
Toriyama et al.

(10) Patent No.: US 7,453,544 B2
(45) Date of Patent: Nov. 18, 2008

(54) LIQUID CRYSTAL DISPLAY DEVICE AND PROJECTION TYPE DISPLAY APPARATUS

(75) Inventors: Akiko Toriyama, Kanagawa (JP); Hisashi Kadota, Kanagawa (JP); Makoto Hashimoto, Kanagawa (JP); Hirohide Fukumoto, Kagoshima (JP); Hiromi Fukumori, Miyazaki (JP)

(73) Assignee: Sony Corporation (JP)

( * ) Notice: Subject to any disclaimer, the term of this patent is extended or adjusted under 35 U.S.C. 154(b) by 88 days.

(21) Appl. No.: 10/579,202

(22) PCT Filed: Nov. 16, 2004

(86) PCT No.: PCT/JP2004/016995
§ 371 (c)(1),
(2), (4) Date: May 12, 2006

(87) PCT Pub. No.: WO2005/050304
PCT Pub. Date: Jun. 2, 2005

(65) Prior Publication Data
US 2007/0121050 A1 May 31, 2007

(30) Foreign Application Priority Data
Nov. 21, 2003 (JP) .............................. 2003-392940

(51) Int. Cl.
G02F 1/1339 (2006.01)
G02F 1/1335 (2006.01)
(52) U.S. Cl. ............................... 349/153; 349/5; 349/10
(58) Field of Classification Search .................. 349/153, 349/5, 10
See application file for complete search history.

(56) References Cited

U.S. PATENT DOCUMENTS 4,997,243 A * 3/1991 Aiki et al. ...................... 385/92
5,327,271 A * 7/1994 Takeuchi et al. ............... 349/88
5,694,506 A * 12/1997 Kobayashi et al. ............. 385/60
5,748,275 A * 5/1998 Sato et al. ..................... 349/144
5,945,688 A * 8/1999 Kasahara et al. .............. 257/81

(Continued)

FOREIGN PATENT DOCUMENTS

EP 0 413 161 2/1991

(Continued)

OTHER PUBLICATIONS

Japanese Office Action: Application No. 2003-392940; Dated: May 8, 2007.
Supplemental Europen Search Report for corresponding European Application No. 04 81 8895 dated Mar. 25, 2008.
PCT International Search Report mailed on Mar. 1, 2005.

*Primary Examiner*—K. Cyrus Kianni
(74) *Attorney, Agent, or Firm*—Rader Fishman & Grauer PLLC; Ronald P. Kananen

(57) ABSTRACT

A liquid crystal display device having a high quality able to prevent deterioration etc. of a liquid crystal panel even when a liquid crystal panel used in a light valve of a projector etc. is operated under a high temperature and high humidity environment and a projection type display apparatus using the liquid crystal display device, wherein a liquid crystal layer 16 is sandwiched between a pair of substrates formed by bonding a TFT array substrate 11 and a counter substrate 12 by a sealing material 15 so that they face each other across a predetermined gap, the sealing material 15 contains a non-conductive filler having a mean particle size of less than 0.5 μm, a liquid crystal material used in the liquid crystal layer 16 is set in its refractive index anisotropy an at room temperature to 0.16 or more, and a cell gap d of an interval between the TFT array substrate 11 and the counter substrate 12 is set at 3 μm or less.

7 Claims, 9 Drawing Sheets

U.S. PATENT DOCUMENTS

| | | | |
|---|---|---|---|
| 6,330,776 B1 * | 12/2001 | Jinno et al. | 52/649.1 |
| 6,661,488 B1 * | 12/2003 | Takeda et al. | 349/117 |
| 7,199,855 B2 * | 4/2007 | Yoshimi et al. | 349/187 |
| 7,277,140 B2 * | 10/2007 | Kurihara et al. | 349/96 |
| 2003/0002822 A1 * | 1/2003 | Ishihara et al. | 385/88 |
| 2003/0021574 A1 * | 1/2003 | Inokuchi et al. | 385/137 |
| 2003/0096541 A1 * | 5/2003 | Onizuka et al. | 439/876 |
| 2003/0107698 A1 * | 6/2003 | Nagayama et al. | 349/149 |
| 2003/0137624 A1 * | 7/2003 | Kang et al. | 349/113 |
| 2004/0021818 A1 * | 2/2004 | Utsumi et al. | 349/141 |
| 2004/0189923 A1 * | 9/2004 | Kondo et al. | 349/141 |
| 2004/0223701 A1 * | 11/2004 | Tanaka et al.. | 385/55 |
| 2005/0105016 A1 * | 5/2005 | Kurihara et al. | 349/96 |
| 2006/0210225 A1 * | 9/2006 | Fujiwara et al. | 385/92 |
| 2007/0013862 A1 * | 1/2007 | Tashiro et al. | 349/187 |
| 2007/0177844 A1 * | 8/2007 | Nagasaka | 385/89 |
| 2007/0259134 A1 * | 11/2007 | Nozoe et al. | 428/1.31 |

FOREIGN PATENT DOCUMENTS

| | | |
|---|---|---|
| JP | 11-015005 A | 1/1999 |
| JP | 11-095232 A | 4/1999 |
| JP | 11-149081 A | 6/1999 |
| JP | 2000-284297 A | 10/2000 |
| JP | 2003-149653 | 5/2003 |
| JP | 2003-228085 A | 8/2003 |

* cited by examiner

LIQUID CRYSTAL DISPLAY DEVICE AND PROJECTION TYPE DISPLAY APPARATUS

TECHNICAL FIELD

The present invention relates to a liquid crystal display device in which a liquid crystal layer is sandwiched between a pair of substrates bonded to each other by a sealing material so that alignment films face each other across a predetermined gap and a projection type display apparatus using this liquid crystal display device.

BACKGROUND ART

A liquid crystal projector or other projection type display apparatus separates light emitted from a light source into red, green, and blue, modulates the colored light by three light valves each constituted by a liquid crystal display device (hereinafter referred to as an "LCD"), combines the modulated colored lights again, and enlarges and projects the same onto a projection screen.

As a light valve mounted in a liquid crystal projector etc., generally use is made of an active matrix drive type LCD using a thin film transistor (hereinafter referred to as a "TFT") drive.

Almost all active matrix drive type LCDs use nematic liquid crystal. As the main display system, there is an optical rotation mode LCD.

The nematic liquid crystal used in an optical rotation mode LCD is a twisted nematic (TN type) liquid crystal having a molecular orientation twisted by 90 degrees and in principle gives a high contrast ratio and a good gray-scale display property in monochrome display.

For uniform display of active matrix drive type LCDs, it is necessary to uniformly orient the liquid crystal molecules on the entire substrate surface.

In substrates formed with two electrodes formed with alignment films, the alignment films of the substrates are arranged facing each other. In the seal region located around a pixel display area in which an image is actually displayed, the substrates are bonded to each other by a sealing material. In order to control the gap between the substrates, use is made of spherical spacers called "micro pearls" before the above bonding or use is made of columnar spacers formed by a resist.

By going through these processes, empty cells are produced. Thereafter, a liquid crystal is sealed in the empty cells whereby liquid crystal cells are formed.

Note that the above liquid crystal is comprised of several types of single liquid crystal materials and is also called a "liquid crystal composition". Polarizers are attached to the produced liquid crystal cells whereby the liquid crystal display device is completed.

In these liquid crystal panels, at the time of the formation of the seal, if portions of the alignment films and the seal are superimposed on each other, the shielding property is lowered, the seal peels off, and other problems arise or moisture invades the liquid crystal through the interface between the alignment films and the seal to cause deterioration of the liquid crystal and other problems. Particularly when forming the films by spin coating, the films are formed up to the ends of the substrates, so the problems occur in a remarkable manner.

Further, in a projection type LCD used in a projector, since the image is projected enlarged, abnormalities in image quality easily stand out. Further, the amount of the light striking the panel is very large in comparison with a direct view type, therefore the panel becomes a high temperature, and deterioration due to entry of a minute amount of moisture is again easily seen.

In order to solve these problems, for example, the method of stopping the entry of moisture by adding a filling agent called a "filler" into the sealing material has generally been used (see for, example, Patent Document 1 and Patent Document 2).

In the LCD of Patent Document 1, a filler with a mean particle size of about 2 µm is added for the purpose of adjusting the viscosity of the seal.

Further, in the LCD of Patent Document 2, conductive beads of 6.0 µM or 6.5 µm are mixed in as conductive materials, and a conductive filler having a mean particle size of 0.1 to 0.5 µm is added in order to obtain conduction between facing electrodes via the conductive beads.

Patent Document 1: Japanese Patent Publication No. 11-15005

Patent Document 2: Japanese Patent Publication No. 11-95232

DISCLOSURE OF THE INVENTION

Problems to be Solved by the Invention

The active matrix drive type LCDs used as the light valves of projection type display apparatuses are being made smaller in size along with the reduction in size of liquid crystal projectors and other projection type display apparatuses. On the other hand, they are being made higher in pixel definition and higher in luminance. Along with the higher definitions, the pitch between the pixels of liquid crystal display devices has become smaller.

For example, in a case of an XGA (extended Graphics Array) type having a substrate size of 22.9 mm (0.9 inch), the number of pixels is 1024.times.768, so the pixel pitch becomes 18 µm.

Since devices are becoming higher in definition, the intervals between transparent electrodes (for, example, ITO: Indium Tin Oxide) of the pixels are becoming increasingly narrow. In a case where potentials at the pixels are inverted, an electric field is generated in a lateral direction.

Due to the generation of this lateral direction electric field, the orientation of the liquid crystal molecules at the boundaries of the transparent electrodes is disturbed, a borderline is generated at the boundary between the disturbed portion and a normal portion (hereinafter also referred to as a "discrimination line") as a display defect, and the contrast falls. Further, along with the higher luminance, this display defect becomes remarkable.

Accordingly, in a matrix type liquid crystal display device provided with TFTs (thin film transistors) and other switching elements, it is difficult to achieve both a high aperture ratio and a high contrast ratio.

Further, in the LCD disclosed in Patent Document 1 or 2, when using a filler having a mean particle size of about 2 µm or mixing in conductive beads of 6.0 µm or 6.5 µm and using a conductive filler having a mean particle size of 0.1 to 0.5 µm, in a projector or other liquid crystal panel having a narrow gap tending to narrow the cell gap, there is the disadvantage that a gap defect occurs, so poor reliability frequently occurs.

An object of the present invention is to provide a high quality liquid crystal display device able to prevent deterioration, etc. of a liquid crystal panel even if the liquid crystal panel used for the light valve of a projector, etc. is operated under a high temperature and high humidity environment, and a projection type display apparatus using that liquid crystal display device.

Means for Solving the Problems

To achieve the above object, a first aspect of the present invention provides a liquid crystal display device having two substrates on which alignment films for orienting liquid crystal in a predetermined direction are formed, the alignment films facing each other across a predetermined gap by using a sealing material to bond the pair of substrates between which a liquid crystal layer is sandwiched, wherein the sealing material contains a filler having a mean particle size of less than 0.5 µm, the liquid crystal material used in the liquid crystal layer has a refractive index anisotropy at room temperature of 0.16 or more, and a cell gap is 3 µm or less.

Preferably, the content of the filler contained in the sealing material is within a range of 15 to 40 wt %.

Preferably, a maximum particle size of the filler contained in the sealing material is 1.5 µm or less.

Preferably, a specific surface area of the filler contained in the sealing material is 30 $m^2/g$ or less.

Preferably, there is an alignment film under the seal of at least one substrate.

Further, preferably, the alignment film material is an inorganic alignment film.

A second aspect of the present invention provides a projection type display apparatus comprising a light source, a condensing optical system for guiding the light emitted from the light source to a liquid crystal display device, and a projection optical system for enlarging and projecting light modulated by the liquid crystal display device, wherein the liquid crystal display device has two substrates on which alignment films for orienting liquid crystal in a predetermined direction are formed, the alignment films facing each other across a predetermined gap by using a sealing material to bond the pair of substrates between which a liquid crystal layer is sandwiched, the sealing material contains a filler having a mean particle size of less than 0.5 µm, the liquid crystal material used in the liquid crystal layer has a refractive index anisotropy at room temperature of 0.16 or more, and a cell gap is 3 µm or less.

According to the present invention, for example, the smaller the size of the filler used for the purpose of reliability against entry of moisture, the more effective. According to experiments, unless using a filler having a mean particle size of less than 0.5 µm, desirably 0.3 µm, poor reliability occurring due to entry of moisture frequently occurs, and no effect is seen at all.

Further, if the content of the filler is less than 15 wt %, no effect is seen at all against poor reliability due to the entry of moisture, while when larger than 40 wt %, the viscosity ends up rising, and the work efficiency is degraded.

Further, as the grounds for why the maximum particle size of the filler contained in the sealing material is 1.5 µm or less, if using a filler in which particles having a large size are mixed, in a projector of another liquid crystal panel having a narrow gap of a cell gap of 3 µm or less, gap defects will end up occurring. Further, the specific surface area is the surface area per unit weight, but when it becomes too large, the ratio of minute particles becomes large, and the viscosity of the sealing material abruptly rises. According to experiments, if the specific surface area is 30 $m^2/g$ or less, a sealing material having no problems in work efficiency can be obtained. The shape of these fillers is preferably spherical. The reason for this is that the specific surface area of a sphere is the smallest and the rise in viscosity is small when it is mixed into a sealing material.

Further, when the alignment films and a portion of the seal are superimposed, the shielding property is lowered and various other problems occur. In recent years, spin coating has been used for forming the alignment films for the purpose of shortening the tact time and reducing the material used and thereby lowering the cost, but in this case, the films are formed up to the ends of the substrates, therefore the seal and the alignment films end up being completely superimposed over each other, so the drop in the reliability becomes a big problem. The present invention is very effective, particularly for a liquid crystal display device employing alignment films formed by spin coating.

Further, the liquid crystal material used in the liquid crystal layer is characterized in that the refractive index anisotropy at room temperature is 0.16 or more and the cell gap is 3 µm or less.

As devices become higher in definition and the pixels become smaller in size, the cell gaps will probably become increasingly narrow. In particular, fine filler of less than a 0.5 µm size will probably be very effective.

In a projection type LCD, since images are projected enlarged, abnormalities in image quality tend to appear more conspicuously. Deterioration due to the panel becoming high in temperature and minute amounts of moisture entering also tends to be easily seen. The present invention is extremely effective particularly, for projection type liquid crystal display devices.

Effect of the Present Invention

According to the present invention, there are the advantages that a higher image quality can be realized by an improvement of the moisture resistance and a higher contrast can be realized by the higher refractive index anisotropy liquid crystal and the narrower cell gap along with higher definition.

Further, a reduction of the seal width becomes possible, and a higher aperture ratio can be realized by the smaller size of the panel or larger valid pixel area.

Further, in a projector or other projection type LCD, there are the advantages that a higher luminance can be realized by the possible higher illumination of the lamp, and that an improvement of the work efficiency, a higher productivity due to the prevention of abnormalities in the cell gap, and a higher yield can be realized. Further, there is the advantage that a response speed can be improved by narrowing the cell gap. This is useful for moving picture characteristics.

DESCRIPTION OF NOTATIONS

10 . . . liquid crystal display device; 11 . . . TFT array substrate; 12 . . . counter substrate; 13 . . . pixel electrode; 14 . . . counter electrode; 15 . . . sealing material; 16 . . . liquid crystal layer; 20, 21 . . . alignment films; 300, 500 . . . projection type display apparatuses; 301, 520 . . . light sources; 303, 506 . . . projection optical systems; 310, 600 . . . projection screens.

BEST MODE FOR WORKING THE INVENTION

Below, embodiments of the present invention will be explained with reference to the drawings.

Figure 1:
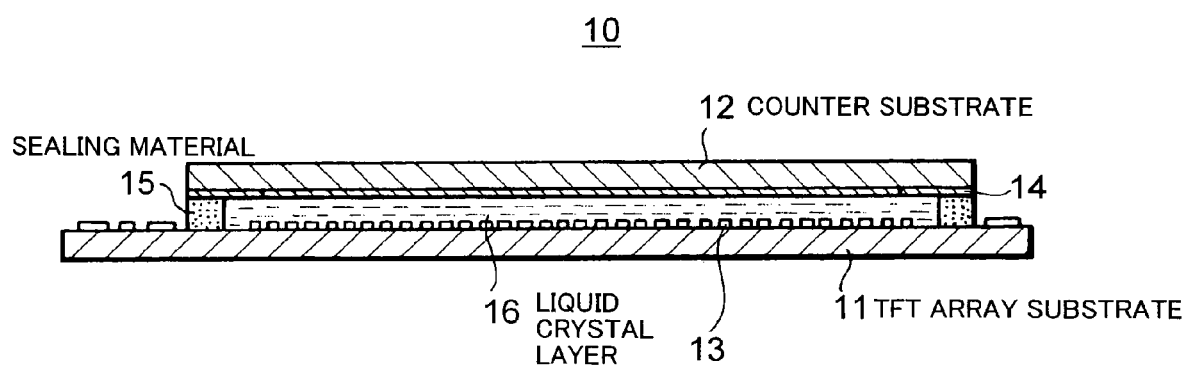
FIG. 1 is a sectional view showing the schematic configuration of an active matrix type liquid crystal display device according to the present invention.

FIG. 1 is a sectional showing the schematic configuration of an active matrix type liquid crystal display device according to the present invention.

A liquid crystal display device 10 according to the present embodiment is provided with, as shown in FIG. 1, two substrates arranged so as to face each other, that is, a TFT array substrate 11 and a transparent counter substrate 12 arranged so as to face the TFT array substrate 11.

The TFT array substrate 11 is made of, for example, a quartz substrate, while the counter substrate 12 is made of, for example, a glass substrate or a quartz substrate. The TFT array substrate 11 is provided with pixel electrodes 13 and is made of a transparent conductive thin film, such as ITO film (Indium Tin Oxide). The counter substrate 12 is formed with an ITO film 14 on the entire surface on the side facing the TFT array substrate 11.

The TFT array substrate 11 and the counter substrate 12, as will be explained later, are formed with not shown alignment films for orienting the liquid crystal in predetermined directions. The alignment films are made to face each other across a predetermined gap by using a sealing material 15 to bond the pair of substrates between which a liquid crystal layer 16 is sandwiched (sealed).

Further, in the liquid crystal display device 10 according to the present embodiment, the sealing material 15 contains a nonconductive filler having a mean particle size of less than 0.5 μm.

Further, in the liquid crystal display device 10 according to the present embodiment, the refractive index anisotropy Δn of the liquid crystal material used in the liquid crystal layer 16 at room temperature is set at 0.16 or more, for example, 0.16, 0.17, 0.18, or 0.20, and the interval between the TFT array substrate 11 and the counter substrate 12 (in actuality, the interval between one alignment film and another alignment film), that is, the cell gap d, is set at 3 μm or less.

Below, a further detailed explanation will be given of the characteristic features of the liquid crystal display device 10 according to the present embodiment, that is, the refractive index anisotropy Δn and the cell gap d of the liquid crystal material and the set value of the filler contained in the sealing material 15.

A liquid crystal display device 10 having such a configuration is used as, for example, a light valve of a projection type display apparatus.

Liquid crystal display devices 10 used as the light valves of liquid crystal projectors or the like are being made smaller in size along with the reduction in size of projection type display apparatuses and are being made higher in definition, such as with a pixel pitch of 20 μm or less, for example, 18 μm in an XGA type.

In this way, in a liquid crystal projector or other device with a narrow pitch of 20 μm or less, there is a problem of a reverse tilt domain (RDT) due to the lateral electric field. As a countermeasure for this, it is effective to narrow the gap, that is, make the cell gap smaller, to strengthen the electric field in the vertical direction of the TFT array substrate 11 and the counter substrate 12 and prevent the influence of the electric field in the lateral direction.

Figure 2:
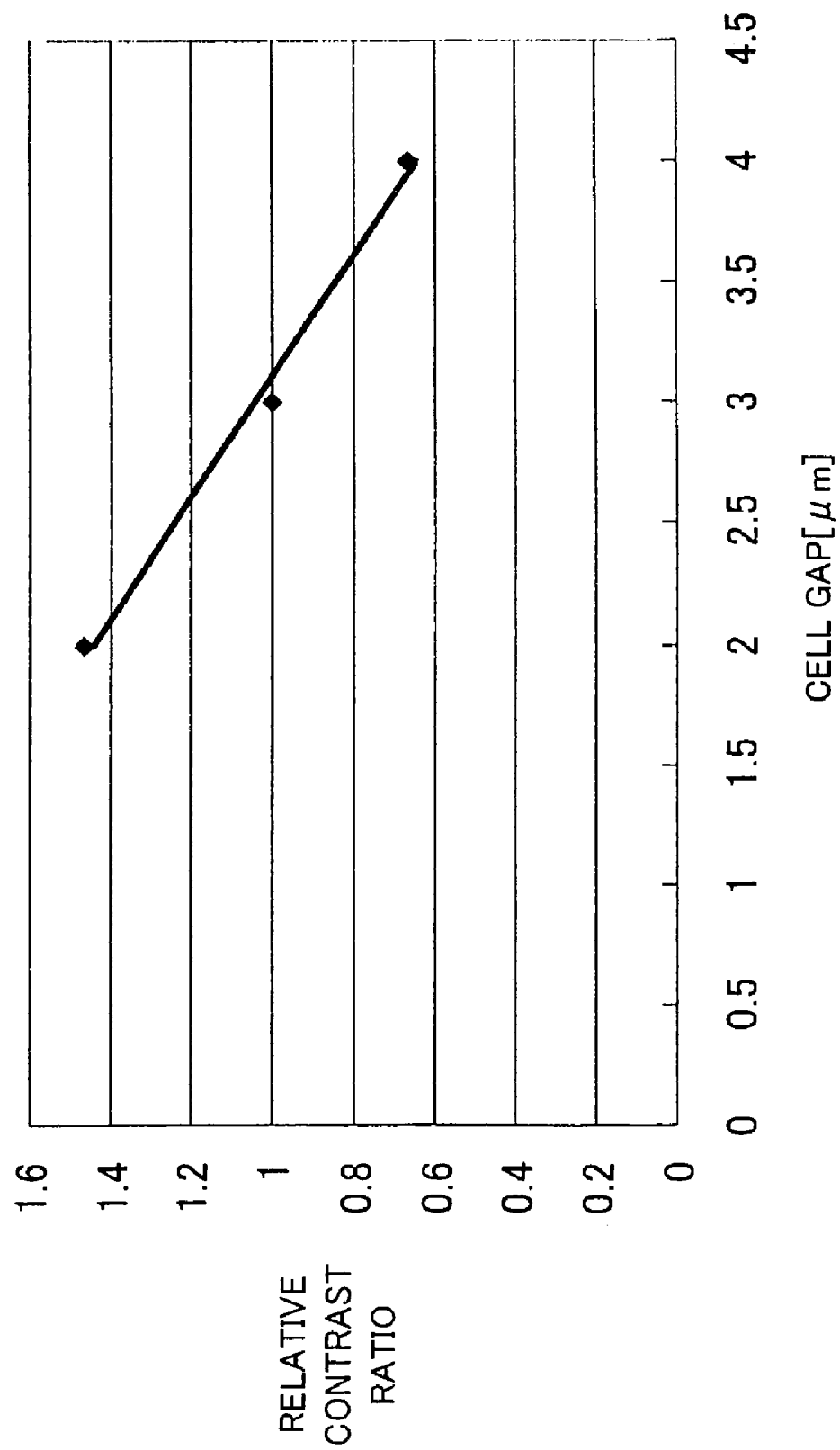
FIG. 2 is a diagram showing the relationship between a cell gap and contrast.

FIG. 2 is a diagram showing the relationship between the cell gap and contrast.

In FIG. 2, the abscissa indicates the cell gap d, and the ordinate indicates the relative contrast ratio. Further, the measurement was carried out by using a monochrome display 3-plate type projector in a dark room under the condition of one point at the center of the panels.

As shown in FIG. 2, in order to satisfy the relative contrast ratio of 1 or more, the cell gap d is desirably 3 μm or less.

Namely, when narrowing the gap, the effective applied voltage rises, so it becomes possible to obtain a high contrast ratio and it also becomes possible to realize an improvement of the response speed.

Next, consider the relationship between the cell gap d and the refractive index anisotropy Δn.

Figure 3:
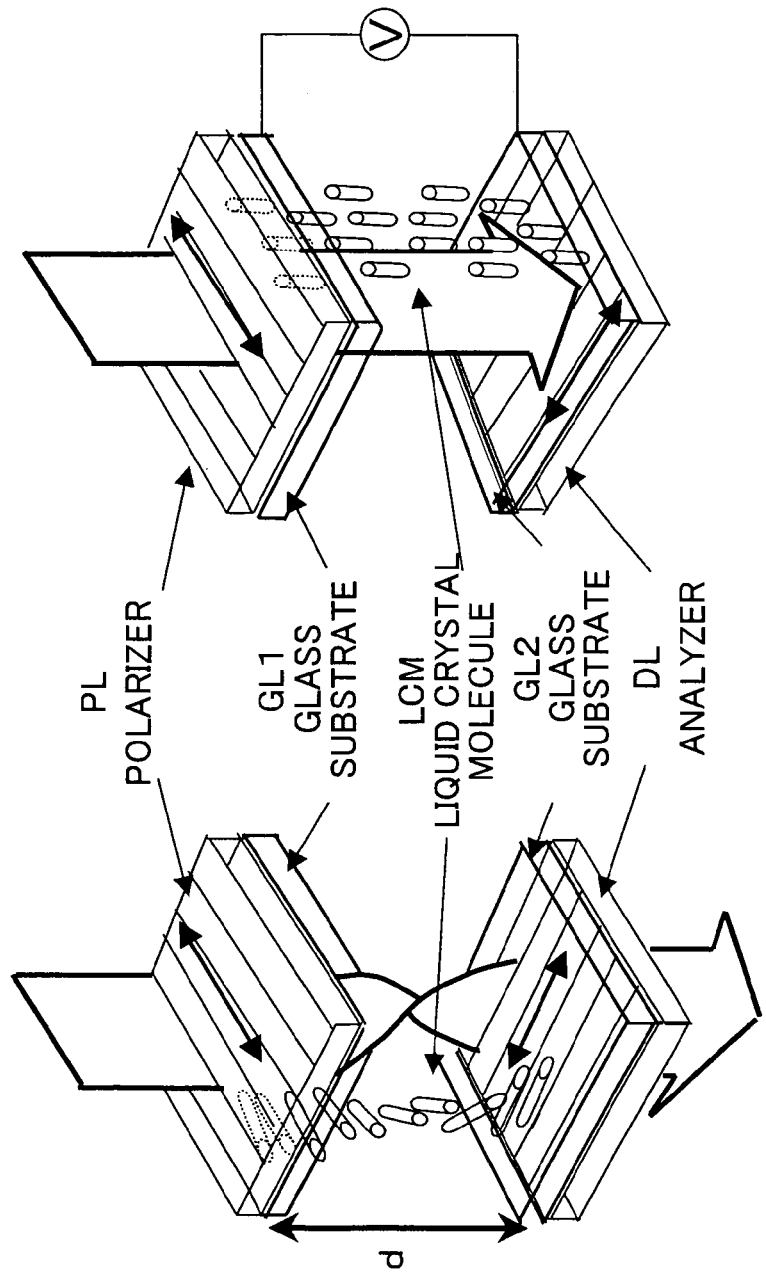
FIG. 3A and FIG. 3B are views for explaining the relationship between a cell gap d and a refractive index anisotropy Δn.

FIG. 3A and FIG. 3B are views for explaining the relationship between the cell gap d and the refractive index anisotropy Δn.

In FIG. 3A and FIG. 3B, PL indicates a polarizer, DL indicates a analyzer, GL1 and GL2 indicate glass substrates, and LCM indicates a liquid crystal molecule.

In a light valve using the liquid crystal display device 10, as shown in FIG. 3A and FIG. 3B, when the polarizer PL and the analyzer DL are arranged perpendicularly to each other and in the case of a normally white (NW) mode where white is displayed when turned off, Δnd giving a high transmittance is determined by the following Gooch-Tarry formula:

Gooch-Tarry formula [Formula 1]

$$T = 1 - \frac{\sin^2((1+(2\Delta nd/\lambda)^2)^{1/2}\pi/2)}{1+(2\Delta nd/\lambda)^2}$$

In other words, the transmittance when the voltage is OFF depends upon the wavelength of the light and the retardation (Δnd), and the relationship of the above Gooch-Tarry formula stands.

Figure 4:
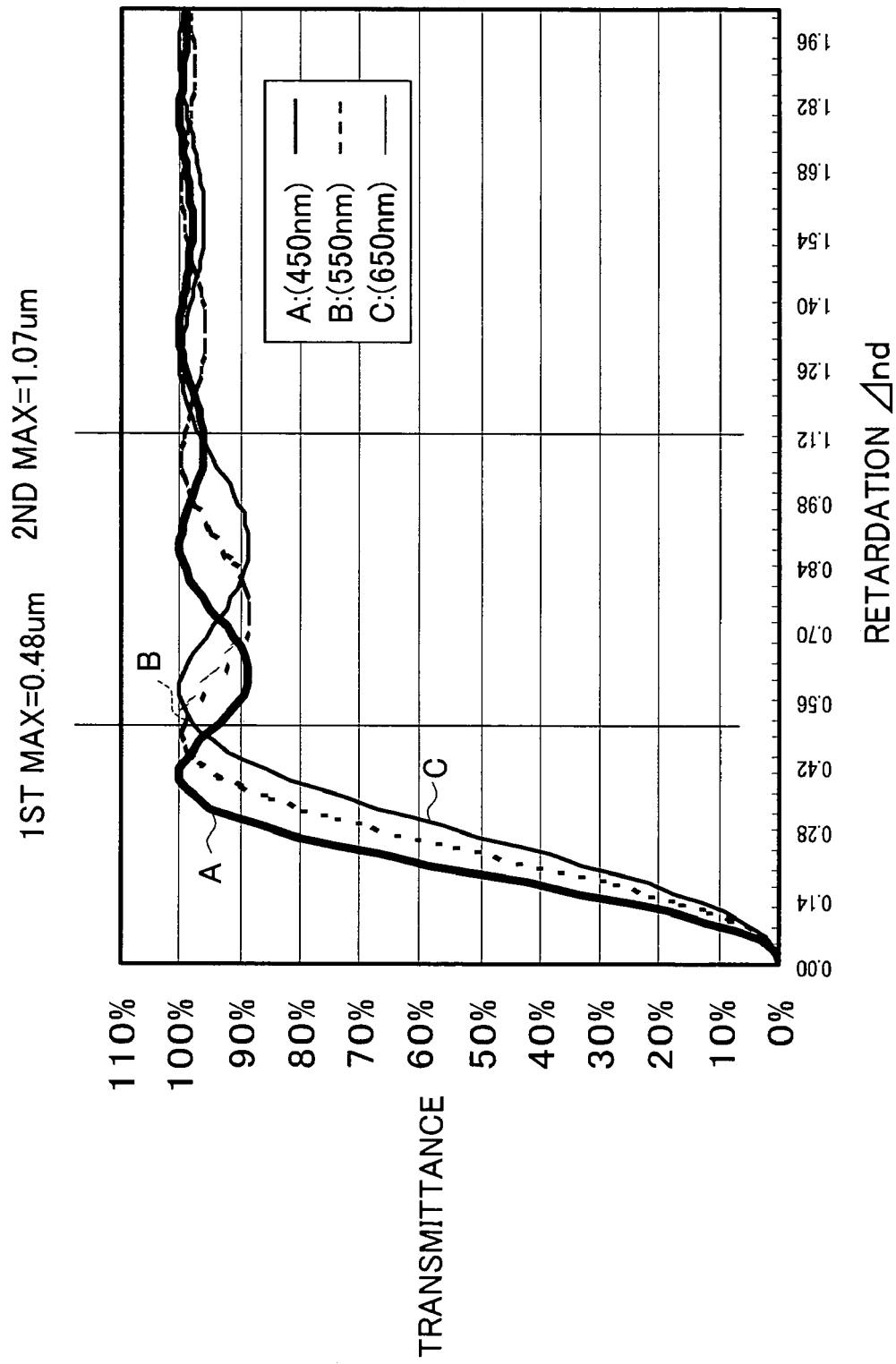
FIG. 4 is a diagram showing the relationship between retardation (Δnd) and transmittance.

FIG. 4 is a diagram showing the relationship between the retardation (Δnd) and the transmittance.

In FIG. 4, the abscissa indicates the retardation (Δnd), and the ordinate indicates the transmittance.

Further, in FIG. 4, a curve indicated by A shows the characteristic of blue light having a wavelength of 450 nm, a curve indicated by B shows the characteristic of green light having a wavelength of 550 nm, and a curve indicated by C shows the characteristic of red light having a wavelength of 650 nm.

When designing a cell, use is made of the Δnd of the maximum value of the transmittance of the green light based on the above Gooch-Tarry Formula. In the example of FIG. 4, there are two maximum values of the transmittance of the green light with respect to the retardation (Δnd), that is, 0.48 μm and 1.07 μm, but usually the first maximum value 0.48 μm is employed due to the relationship with the response speed.

Namely, the cell is designed to be able to obtain the maximum transmittance when the refractive index anisotropy Δn of the liquid crystal material x cell gap d=0.48.mu. (480 nm).

In order to obtain this maximum transmittance, when applying a countermeasure, such as reduction of the cell gap explained above, it is necessary to make the refractive index anisotropy Δn of the liquid crystal higher.

Namely, in order to realize a narrow cell gap d, it becomes necessary to make the Δn of the liquid crystal higher.

However, in a liquid crystal, generally, as the refractive index anisotropy Δn becomes higher, the moisture resistance and the heat resistance tend to be degraded, and the selection of the liquid crystal materials tends to become smaller.

Table 1 shows the relationship between the Δn and display abnormalities in an environment test.

Table 1 shows results by running an accelerated drive test to a past liquid crystal display device by using an environment tester under an environment of 60° C. and 90%.

TABLE 1

|  | Display abnormality | | | | |
|---|---|---|---|---|---|
| Δn | 0.12 | 0.14 | 0.16 | 0.18 | 0.2 |
| 0 h | OK | OK | OK | OK | OK |
| 10 h | OK | OK | OK | OK | OK |
| 30 h | OK | OK | OK | OK | NG |
| 50 h | OK | OK | OK | NG | NG |
| 100 h | OK | OK | NG | NG | NG |

As seen from Table 1, when the refractive index anisotropy Δn is 0.16 or more, along with aging, display abnormalities start to occur. When it becomes 0.18 or 0.20, the probability of the occurrence of display abnormalities becomes higher.

Therefore, in order to suppress the occurrence of display abnormalities, even in the case of this high Δn, the interval between the TFT array substrate 11 and the counter substrate 12, that is, the cell gap d, is set at 3 μm or less, the refractive index anisotropy Δn of the liquid crystal material used in the liquid crystal layer 16 at room temperature is set at 0.16 or more, and further a nonconductive filler having a mean particle size of less than 0.5 μm is contained in (added to) the sealing material 15.

The liquid crystal display device 10 according to the present embodiment to which a nonconductive filler having a mean particle size of less than 0.5 μm was added in this way was subjected to an accelerated drive test using an environment tester under an environment of 60° C. and 90%.

The results are shown in Table 2.

TABLE 2

|  | Display abnormalities | | | | |
|---|---|---|---|---|---|
| Δn | 0.12 | 0.14 | 0.16 | 0.18 | 0.2 |
| 0 h | OK | OK | OK | OK | OK |
| 10 h | OK | OK | OK | OK | OK |
| 30 h | OK | OK | OK | OK | OK |
| 50 h | OK | OK | OK | OK | OK |
| 100 h | OK | OK | OK | OK | OK |

As shown in Table 2, in the liquid crystal display device 10 according to the present embodiment, the occurrence of display abnormalities along with aging is suppressed irrespective of the high Δn.

Note that, the results of Table 2 are based on specific examples explained later in detail.

In the case of application of the liquid crystal display device for a projector, light of 20,000,000 LX or more is illuminated, and the operation temperature becomes 60° C. or more.

Accordingly, as shown by the results of Table 2, even when the liquid crystal display device 10 according to the present embodiment is used under actual severe conditions, there is no worry about the occurrence of display abnormalities along with aging.

For example, in a high Δn liquid crystal, that is, a tolan system, Δn=0.2, but according to the liquid crystal display device 10 according to the present embodiment, as shown in Table 2, there is no apprehension of the occurrence of display abnormalities along with aging even when Δn=0.2, therefore the selection of the liquid crystal materials is broadened, and, as a result, a high Δn material margin can be realized.

Non-patent Document 1: Monthly Display, January 2002, High Refractive Index Anisotropy Liquid Crystals, SUMITOMO. CHEMICAL Ltd., Sekine et al.

As described above, along with the narrowing of the gap, a higher refractive index anisotropy (Δn) is necessary. In order to achieve this, a nonconductive filler having a mean particle size of less than 0.5 g/m is added to the sealing material 15.

Conversely, when a higher Δn can be achieved, as in the present embodiment, a narrowing of the gap can be realized, the reverse tilt domain (RTD) countermeasure can be taken, and it becomes possible to achieve a higher image quality and a higher definition.

Due to this, the effective application voltage rises, the field intensity rises, and a higher contrast can be achieved.

With the future increasingly higher definitions and smaller sizes, along with the reduction of the pixel pitch, the influence of the reverse tilt domain (RTD) will become further severe, but the liquid crystal display device 10 according to the present embodiment can sufficiently cope with this. Further, an improvement of the response speed can be realized.

The filler added to the sealing material 15, for example, the silica, must have little variation in quality, be good in uniformity, and be small in particle size. In the present embodiment, the mean particle size is set at less than 0.5 μm.

In the present embodiment, the following conditions are set for the filler added to the sealing material 15. Note that, in the following conditions, the reasons (grounds) for selection by the plurality of examples explained in detail later are clearly proved.

Namely, the content of the filler contained in the sealing material 15 is within the range of 15 to 40 wt %.

Further, the maximum particle size of the filler contained in the sealing material 15 is 1.5 μm or less.

Further, the specific surface area of the filler contained in the sealing material 15 is 30 $m^2$/g or less.

Further, the TFT array substrate 11 and the counter substrate 12 are formed with alignment films for orienting the liquid crystal in predetermined directions, but in the present embodiment, at least one substrate between the TFT array substrate 11 and the counter substrate 12 has the alignment film formed under the sealing material.

Here, the mean particle size of the filler may be measured by, for example, a scan type electron microscope (SEM) or may be the cumulative weight mean particle size based on laser scattering. Further, the specific surface area is measured according to the BET method.

The smaller the diameter of the filler used for the purpose of reliability against entry of moisture, the larger the effect. According to experiments, unless a filler having a mean particle size of less than 0.5 µm, desirably 0.3 µm or less, is used, poor reliability frequently occurs due to the entry of moisture. It is seen that the effect is liable to disappear completely.

Further, the content of the filler is set to within the range of 15 to 40 wt % because if the content of the filler is less than 15 wt %, no effect is seen on the poor reliability occurring due to entry of moisture, while if the content is larger than 40 wt %, the viscosity rises and the work efficiency is degraded. Further, as the grounds for making the maximum particle size of the filler contained in the sealing material 15 1.5 µm or less, if a filler containing particles having a large particle size is used, in a liquid crystal panel having a narrow gap, i.e., a cell gap of 3 µm or less, for example, in a projector, gap defects occur.

Further, the grounds for making the specific surface area of the filler contained in the sealing material 15 30 m$^2$/g or less are as follows.

The specific surface area is the surface area per unit weight. When it becomes too large, the ratio of fine particles becomes large, and the viscosity of the sealing material abruptly rises. According to experiments, when the specific surface area was 30 m$^2$/g or less, a sealing material having no problem in work efficiency could be obtained.

The shape of the filler particles is preferably spherical. The reasons for this are the smallest specific surface area of spheres and the small rise in viscosity when mixed into a sealing material.

Further, in the present embodiment, the reason for having at least one substrate between the TFT array substrate 11 and the counter substrate 12 formed with an alignment film under the sealing material is as follows.

When an alignment film and a portion of the sealing material are superimposed on each other, the shielding property is lowered and various other problems occur. In recent years, spin coating has been employed for forming the alignment films for shortening the tact time and reducing the materials and thereby lowering the costs. In this case, the film is formed up to the ends of the substrate. Therefore, the seal and the alignment film are completely superimposed on each other. The drop in reliability has become a big problem.

The present embodiment is extremely effective particularly for a liquid crystal display employing alignment films formed by the spin coating.

Further, the alignment films are inorganic alignment films.

As inorganic alignment films, there can be mentioned silicon oxide, etc. formed by vapor deposition. Also, oxides CaF.sub.2, MgF.sub.2, etc. able to be vapor deposited are possible.

Other than these, materials having a siloxane skeleton formed by printing, spin coating, or ink jet can be mentioned.

A more concrete configuration of the liquid crystal display device 10 having the above configuration will be explained with reference to FIG. 5 and FIG. 6.

Figure 5:
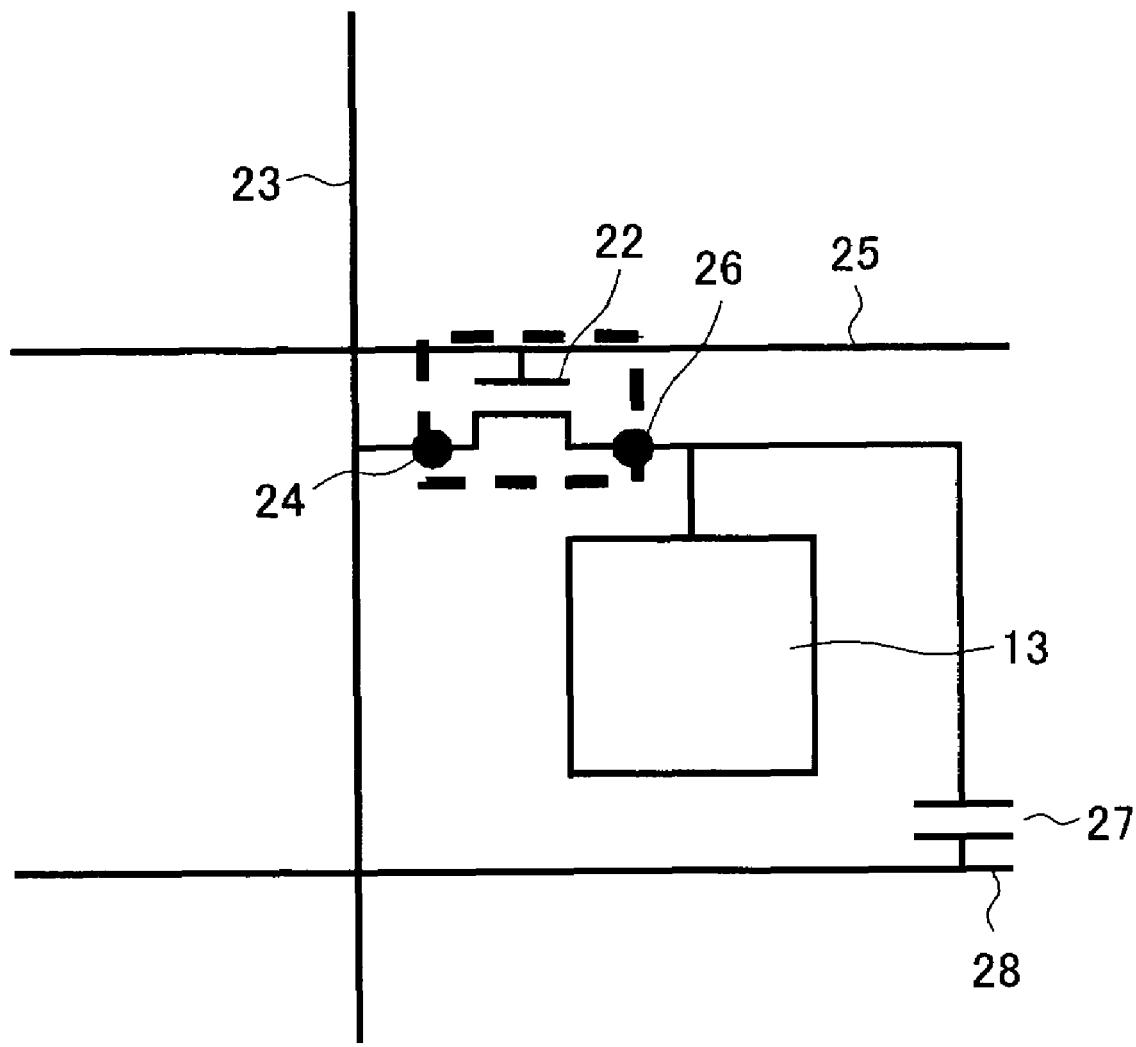
FIG. 5 is a schematic view of a pixel portion of an active matrix type liquid crystal display device according to the present embodiment.
Figure 6:
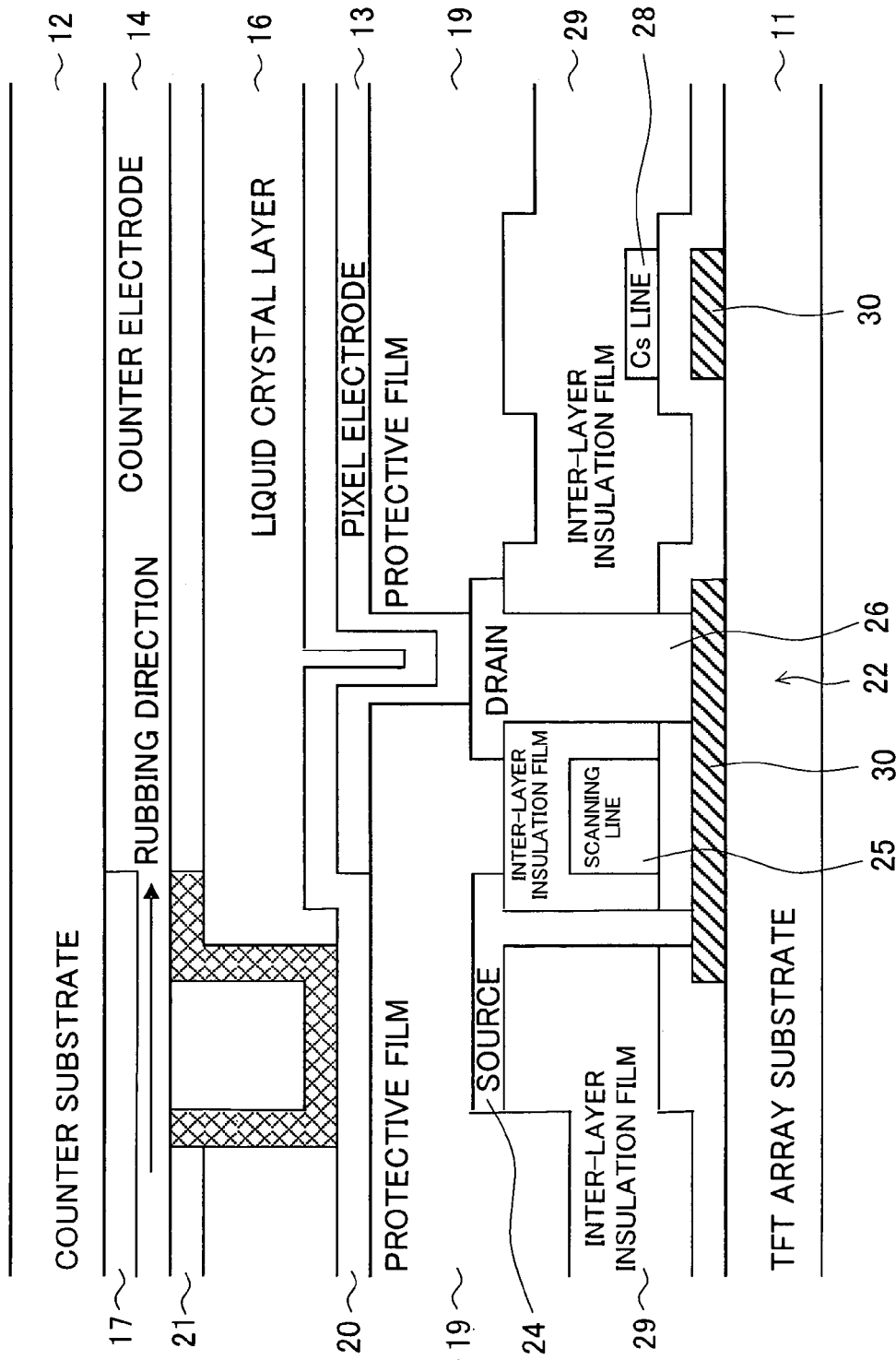
FIG. 6 is an example of a sectional view of an active matrix type liquid crystal display device of the present embodiment.

FIG. 5 is a schematic view of a pixel portion of an active matrix type liquid crystal display device according to the present embodiment, while FIG. 6 is an example of a sectional view of an active matrix type liquid crystal display device of the present embodiment.

The liquid crystal display device 10 is provided with, as explained with reference to FIG. 1, a TFT array substrate 11 and a transparent counter substrate 12 arranged so as to face this. The TFT array substrate 11 is made of, for example, a quartz substrate, while the counter substrate 12 is made of, for example, a glass substrate or a quartz substrate. The TFT array substrate 11 is provided with pixel electrodes 13 and is made of a transparent conductive thin film, such as an ITO film (Indium Tin Oxide film). The counter substrate 12 is provided with the ITO film (counter electrode) 14 explained above over its entire surface. The counter substrate 12 is further provided with a light shielding film 17 in a region other than the opening region of each pixel portion.

The pixel electrode 13 and a protective film 19 and the counter electrode 14 facing this are formed with alignment films 20 and 21 for orienting the liquid crystal 16 in predetermined directions at the time of production of the liquid crystal panel.

Here, a simple explanation will be given of the configuration of the TFT array substrate 11.

Each of the plurality of pixel electrodes 13 formed in a matrix for forming the image display area of the liquid crystal display device 10 is provided with a pixel switching use TFT 22 for controlling the pixel electrode 13 at an adjacent position.

A signal line 23 to which a pixel signal is supplied is electrically connected to a source 24 of the TFT 22 explained before. It supplies the pixel signal to be written to the signal line 23.

Further, a scanning line 25 is electrically connected to a gate of the TFT 22 and applies a scanning signal to the scanning line 25 in the form of a pulse at a predetermined timing.

The pixel electrode 13 is electrically connected to a drain 26 of the TFT 22. By making the switch of the switching element constituted by the TFT 22 conductive for exactly a constant period, the pixel signal supplied from the signal line 23 is written at a predetermined timing.

The pixel signal of a predetermined level written in the liquid crystal via the pixel electrode 13 is held for a constant period between the same and the counter electrode (ITO film) 14 formed on the counter substrate 12.

The liquid crystal layer 16 modulates the light by the change of orientation and order of molecules set according to the applied voltage level and enables a gray-scale display. In a normally white display, the incident light is allowed to pass through this liquid crystal portion in accordance with the applied voltage, and as a whole, light having a contrast in accordance with the pixel signal is emitted from the liquid crystal display device.

Here, in order to prevent a held pixel signal from leakage, a storage capacitor 27 is added parallel to a liquid crystal capacitor formed between the pixel electrode 13 and the counter electrode 14. Due to this, the storage characteristic is further enhanced, and a liquid crystal display device having a high contrast ratio can be realized. Further, in order to form such a storage capacitor 27, a Cs line 28 given a low resistance is provided. Note that, 29 indicates an inter-layer insulation film, and 30 indicates a semiconductor layer.

Then, a transparent resist layer acting as a not shown columnar spacer is formed with respect to the counter substrate 12 explained above.

The substrate is coated with a photoresist comprised of PMER (made by TOKYO OHKA KOGYO CO., LTD.) by spin coating to a thickness of 3 µM, then is exposed by UV-rays using a photo-mask, and then developed, to thereby form a not shown columnar spacer.

Below, an explanation will be given of the process of bonding the TFT array substrate 11 and the counter substrate 12 having the above configurations by the sealing material 15 and the device characteristics as specific Examples 1 to 5.

EXAMPLE 1

Next, an explanation will be given of the process of fabrication of a cell in the present embodiment (process of production of liquid crystal panel) with reference to FIG. 7A to FIG. 7F.

Figure 7:
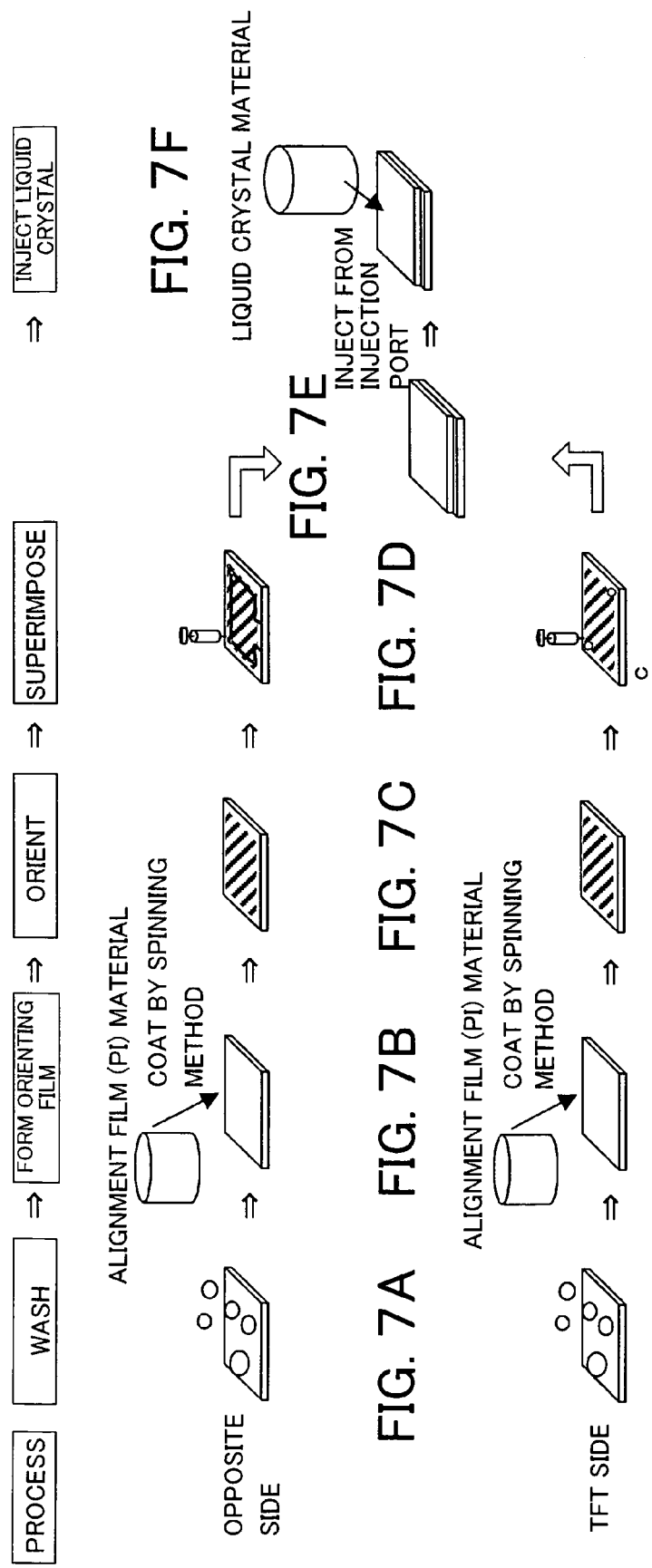
FIG. 7A to FIG. 7F are diagrams for explaining processes of a cell fabricated in the present embodiment (production processes of the liquid crystal panel).

First, as shown in FIG. 7A, the TFT array substrate 11 and the counter substrate 12 were washed by using a neutral detergent or pure water, and then were dried at 120° C. for 20 minutes. As the materials of the substrates, use was made of quartz substrates for both.

Then, as shown in FIG. 7B, each substrate was formed with an alignment film. An alignment film made of polyimide was coated to a thickness of about 50 nm by spin coating and then dried at 100° C. for 1 minute (temporary firing). As the polyimide, use was made of, for example, soluble polyimide (made by Japan Synthetic Rubber Co., Ltd.) (spinner used at 2000 rmp for 30 seconds).

Note that, in the present embodiment, spin coating was used for the formation of the alignment films, but printing may be used or a ink jet may be used as well. Further, the type of the alignment film material is not limited to an organic material such as polyimide. An inorganic material, such as silicon, may also be used. In the case of an inorganic material, vapor deposition may be used in the formation method.

Post baking was carried out at 180° C. for 1 hour to dry off the solvent.

Thereafter, as shown in FIG. 7C, rubbing was carried out. The rubbing was carried out by using a rayon fabric at a rubbing angle of 90° and under a condition of two rubbing operations.

After the rubbing, the film was washed by water in order to remove dust of the fabric used in the rubbing and shaved PI.

Next, a seal pattern excluding an injection port was formed.

As examples of the sealing materials used in this example, sealing materials containing as principal components epoxy resin plus silica fillers (hereinafter referred to as the "filler") and not plus any fillers were used.

As examples of the fillers, melted silica, crystal silica, alumina, silicon nitride, etc. are preferred. Different types of fillers may also be mixed.

As the fillers, spherical silicas having mean particle sizes of four conditions of 0.3 μm, 0.5 μm, 1 μm, and 2 μm, having specific surface areas set at 20 m$^2$/g, having contents of 20 wt %, and having maximum particle sizes of 1.0 μm or less were used.

The mean particle size was measured by SEM by sampling 100 particles, the specific surface area was measured by the BET method, and the content was measured by an electronic balance. As the maximum particle size, the particle having the maximum size was confirmed by a magnification of 30,000. The viscosities of these sealing materials were about 200,000 mPas as a result of the measurement at room temperature by a cone plate type viscometer.

As shown in FIG. 7D, each prepared sealing material was dispensed by a dispenser over the periphery of a counter substrate in a pattern excluding the injection port. As shown in FIG. 7E, the TFT array substrate 1 and the counter substrate 2 were then superimposed on each other, and the cell gap was set at 3.0 μm. The seal width was about 0.7 mm.

Thereafter, as shown in FIG. 7F, the liquid crystal material (Δn=0.16) was filled, and the injection port was sealed (not shown) by an UV-ray curable resin.

As the liquid crystal material, use was made of one obtained by newly adding a minute amount of a monomer having a high refractive index anisotropy Δn.

Each liquid crystal display device of the present example was subjected to an accelerated drive test using an environment tester under an environment of 60° C. and 90%. The results are shown in Table 3.

TABLE 3

Situation of Occurrence of Display Abnormalities After 50 Hours of high temperature high humidity test (60° C., 90%) (Example 1, Example 2)

| Content | Mean particle size (μm) | | | | |
|---|---|---|---|---|---|
| | 0.3 | 0.5 | 1 | 2 | |
| 20 | OK | OK | NG | NG | ← Ex. 1 |
| 10 | NG | | | | |
| 15 | OK | | | | |
| 30 | OK | | | | |
| 40 | OK | | | | |
| 45 | Viscosity rises | | | | |

↑ Ex. 2

When observed after the elapse of 50 hours, display abnormalities due to the entry of moisture occurred when there was no filler and the mean particle size was 1.0 μm and 2.0 μm. The tendency became greater along with the elapse of time, but when the mean particle size was 0.5 μm and 0.3 μm, no display abnormalities occurred even after driving for 100 hours.

In this way, by using the liquid crystal display of this example, a liquid crystal display device having a higher reliability and a higher quality can be obtained.

EXAMPLE 2

Relationship Between Filler Content and Reliability and Display Abnormalities

Up to the rubbing, each display was prepared in the same way as Example 1, and then a seal pattern excluding the injection port was formed.

As examples of the sealing materials used in this example, use was made of sealing materials containing an epoxy resin as a principal component plus silica fillers (hereinafter, referred to as the "filler").

As fillers, spherical silicas having mean particle sizes of 0.3 μm, specific surface areas of 20 m$^2$/g, contents of six conditions of 10 wt %, 15 wt %, 20 wt %, 30 wt %, 40 wt %, and 45 wt %, and maximum particle sizes of 1.0 μm or less were used.

The mean particle size was measured by SEM by sampling 100 particles, the specific surface area was measured by the BET method, and the content was measured by an electronic balance. As the maximum particle size, the particle having the maximum size was confirmed by a magnification of 30,000.

Each prepared sealing material was dispensed by a dispenser over the periphery of a counter substrate in a pattern excluding the injection port, the TFT array substrate 11 and the counter substrate 12 were then superimposed on each other, and the cell gap was set at 3.0 μm. The seal width was about 0.7 mm.

Thereafter, the liquid crystal material (Δn=0.16) was filled, and the injection port was sealed (not shown) by an UV-ray curable resin.

Each liquid crystal display device of this example was observed. The element having the content of 45 wt % was poor in work efficiency, and the seal was broken due to the rise of the viscosity.

Next, each liquid crystal display device of this example was subjected to an accelerated drive test using an environment tester under an environment of 60° C. and 90%.

The results are shown in Table 3. When observing the displays after an elapse of 50 hours, display abnormalities due to entry of moisture occurred when the content was 10 wt %. They did not occur for the display having the content of 15 wt % or more. The tendency became greater along with the elapse of time, but no display abnormalities occurred even after driving for 100 hours in the display having the content of 15 wt % or more.

In this way, by using the liquid crystal display device of this example, a higher reliability and higher quality liquid crystal display device can be obtained.

EXAMPLE 3

Maximum Particle Size and Gap Abnormalities

Up to the rubbing, each display was prepared in the same way as Example 1, and then a seal pattern excluding the injection port was formed.

As examples of the sealing materials used in this example, use was made of sealing materials containing an epoxy resin as a principal component plus silica fillers (hereinafter, referred to as the "filler"). As the fillers, spherical silicas having mean particle sizes of 0.3 μm, specific surface areas of 20 m$^2$/g, contents of 20 wt %, and maximum particle sizes of the five conditions of 0.5 μm, 1.0 μm, 1.5 μm, 2.0 μm, and 3.0 μm were used.

The mean particle size was measured by SEM by sampling 100 particles, the specific surface area was measured by the BET method, and the content was measured by an electronic balance. As the maximum particle size, the particle having the maximum size was confirmed by a magnification of 30,000.

Each prepared sealing material was dispensed by a dispenser over the periphery of a counter substrate in a pattern excluding the injection port, the TFT array substrate 1 and the counter substrate 2 were then superimposed on each other, and the cell gap was set at 3.0 μm. The seal width was about 0.7 mm.

Thereafter, the liquid crystal material (Δn=0.16) was filled, and the injection port was sealed (not shown) by an UV-ray curable resin.

The liquid crystal display devices of this example were observed. The results are shown in Table 4.

TABLE 4

Results of Examination of Gap Abnormalities (Example 3)

|  | Maximum particle size [μm] | | | | |
| --- | --- | --- | --- | --- | --- |
|  | 0.5 or less | 1.0 or less | 1.5 or less | 2.0 or less | 3.0 or less |
| Gap abnormality | OK | OK | OK | NG | NG |

Cell gap abnormalities were observed in the display devices using fillers having maximum particle sizes of 2.0 μm or less and 3.0 g/m or less. No cell gap abnormalities were seen in display devices having maximum particle sizes of 0.5 μm or less, 1.0 μM or less, and 1.5 μm or less.

In this way, by using the liquid crystal display device of this example, a higher reliable and higher quality liquid crystal display can be obtained.

EXAMPLE 4

Specific Surface Area and Work Efficiency

Up to the rubbing, each display was prepared in the same way as Example 1, and then a seal pattern excluding the injection port was formed.

As examples of the sealing materials used in this example, use was made of sealing materials containing an epoxy resin as a principal component plus silica fillers (hereinafter, referred to as the "filler"). As the fillers, spherical silicas having mean particle sizes of 0.3 μm, specific surface areas of the three conditions of 40 m$^2$/g, 30 m$^2$/g, and 20 m$^2$/g, contents of 20 wt %, and maximum particle sizes of 1.0 μm or less were used.

The mean particle size was measured by SEM by sampling 100 particles, the specific surface area was measured by the BET method, and the content was measured by an electronic balance. As the maximum particle size, the particle having the maximum size was confirmed by a magnification of 30,000.

Each prepared sealing material was dispensed by a dispenser over the periphery of a counter substrate in a pattern excluding the injection port, and then work efficiency was evaluated.

The work efficiency was poor when the specific surface area was 40 m$^2$/g, and the seal broke due to the rise of the viscosity. The coating could be carried out without problem when the specific surface area was 30 m$^2$/g and 20 m$^2$/g.

In this way, by using the liquid crystal display device of this example, a higher reliability and higher quality liquid crystal display device can be obtained.

EXAMPLE 5

Use of Liquid Crystals of Δn=0.18 and 0.20

Up to the rubbing, each display was prepared in the same way as Example 1, and then a seal pattern excluding the injection port was formed.

As examples of the sealing materials used in this example, use was made of sealing materials containing an epoxy resin as a principal component plus silica fillers (hereinafter, referred to as the "filler") and not plus silica fillers. As the fillers, spherical silicas having mean particle sizes of 0.3 μm, specific surface areas of 20 m$^2$/g, contents of 20 wt %, and maximum particle sizes of 1.0 μm or less were used.

The mean particle size was measured by SEM by sampling 100 particles, the specific surface area was measured by the BET method, and the content was measured by an electronic balance. As the maximum particle size, the particle having the maximum size was confirmed by a magnification of 30,000.

Each prepared sealing material was dispensed by a dispenser over the periphery of a counter substrate in a pattern excluding the injection port, the TFT array substrate 1 and the counter substrate 2 were then superimposed on each other, and the cell gap was set at 2.65 μm and 2.4 μm. The seal width was about 0.7 mm.

Thereafter, two types of liquid crystal materials (Δ=0.18, 0.20) were injected. The liquid crystal material having Δn=0.18 was injected in a display having a cell gap of 2.65 μm, while the liquid crystal material having Δ=0.20 was injected in a display having a cell gap of 2.4 μm, and then the injection port was sealed (not shown) by a UV-ray curable resin. Note that the ratio of the liquid crystal monomer raising the Δn occupied in the entire liquid crystal composition became larger in a sequence of 0.16<0.18<0.20.

Each liquid crystal display device of this example was subjected to an accelerated drive test using an environment tester under an environment of 60° C. and 90%. The results are shown in Table 1 and Table 2 explained above.

The display devices were observed after the elapse of 10 hours, whereupon the liquid crystal material without a filler (conventional example) and having Δn=0.20 exhibited display abnormalities. The display devices were then observed after the elapse of 30 hours, whereupon the liquid crystal material without a filler (conventional example) and having Δn=0.18 exhibited display abnormalities. It is considered that the time of occurrence of display abnormalities depends upon the amount of the monomer raising the Δn. Note that this tendency becomes greater along with the elapse of time.

In the liquid crystal display devices of this example including the fillers, no display abnormalities occurred even after driving for 100 hours.

In this way, by using the liquid crystal display device of this example, a higher reliability and higher quality liquid crystal display device can be obtained.

Below, an explanation will be given of the configuration of a projection type display apparatus with reference to the schematic view of the configuration of FIG. 9 as an example of an electronic apparatus using a liquid crystal display device having the above characteristic features.

Figure 8:
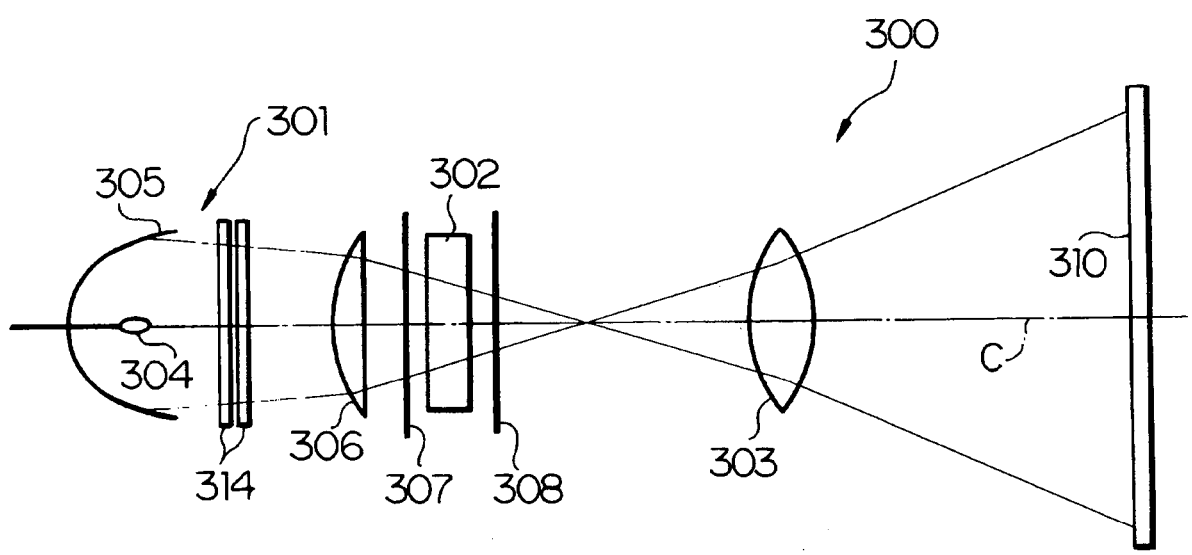
FIG. 8 is a schematic view of the configuration showing an example of an electronic apparatus using the liquid crystal display device according to the present embodiment as constituted by a projection type display apparatus.

As shown in FIG. 8, a projection type liquid crystal display apparatus (liquid crystal projector) 300 is constituted by a light source 301, a transmission type liquid crystal display device 302, and a projection optical system 303 arranged along an optical axis C in sequence.

The light emitted from a lamp 304 constituting the light source 301 is condensed by a reflector 305 to the forward direction in the component radiated backward and made to strike a condenser lens 306. The condenser lens 306 further concentrates the light and guides it to the liquid crystal display device 302 via an incident side polarizer 307.

The guided light is transformed to an image by the liquid crystal display device 302 having a function of a shutter or light valve and an air polarizer 308. The displayed image is projected enlarged onto a screen 310 via the projection optical system 303.

Note that a filter 314 is inserted between the light source 301 and the condenser lens 306, and light having a useless wavelength included in the light source, for example, infrared rays and UV-rays, are eliminated.

Next, an explanation will be given of the configuration of a projection type display apparatus with reference to FIG. 9 as an example of an electronic apparatus using the above liquid crystal display device.

Figure 9:
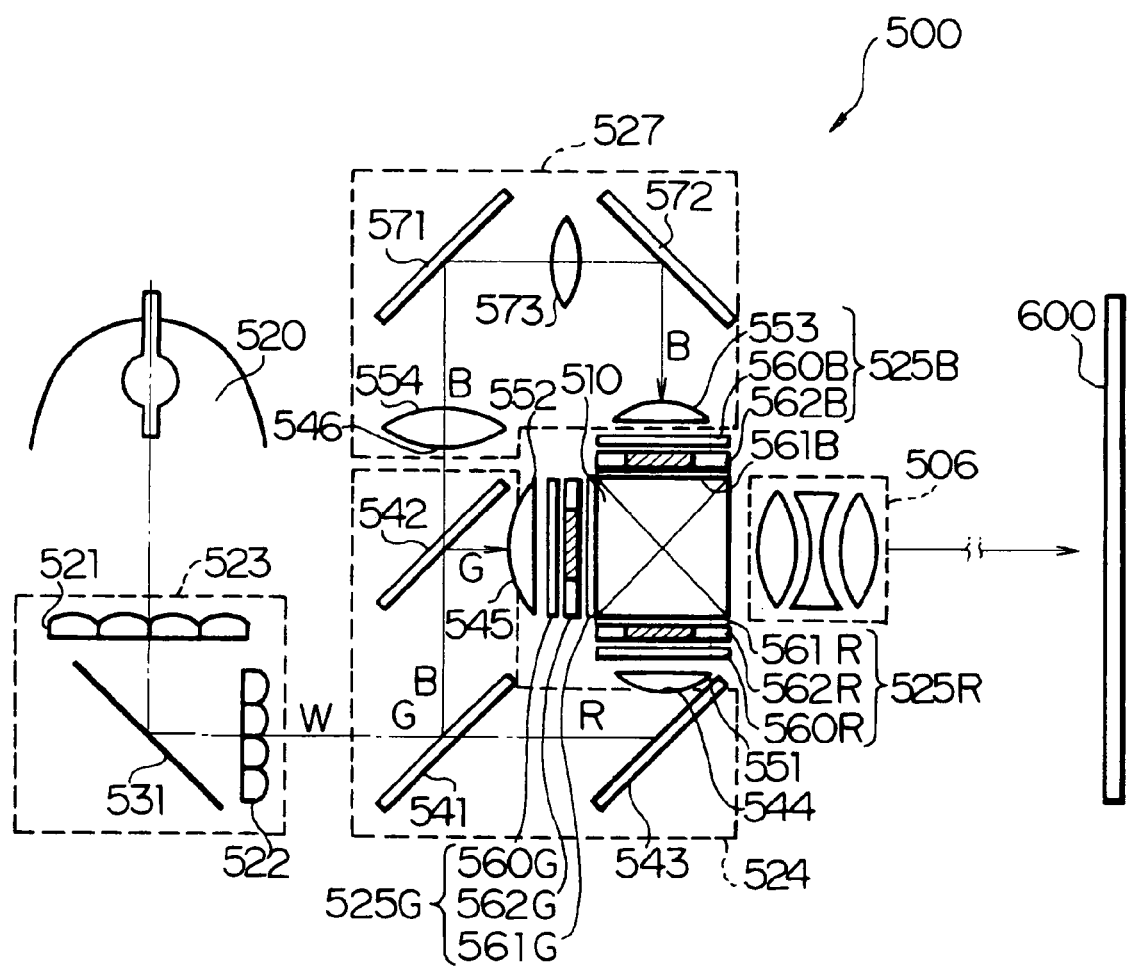
FIG. 9 is a schematic view of the configuration showing another example of an electronic apparatus using the liquid crystal display device according to the present embodiment as constituted by a projection type display apparatus.

As a projection type display apparatus 500 shown in FIG. 9, a schematic view of the configuration of an optical system of a projection type display apparatus provided with three liquid crystal display devices explained above and using them as RGB use liquid crystal display devices 562R, 562G, and 562B is shown.

The projection type display apparatus 500 uses, as the optical system, a light source device 520 and a uniform illumination optical system 523.

A color separation optical system 524 as a color separating means for separating light W emitted from this uniform illumination optical system 523 to red (R), green (G), and blue (B), three light valves 525R, 525G, and 525B as modulating means for modulating the colored light R, G, and B, a color combining prism 510 as a color combining means for recombining the modulated colored light, and a projection lens unit 506 as a projecting means for enlarging and projecting the combined light to the surface of the projection screen 600 are provided. Further, a light guide system 527 for guiding the blue light B to the corresponding light valve 525B is provided.

The uniform illumination optical system 523 is provided with two lens plates 521 and 522 and a reflection mirror 531. The reflection mirror 531 is sandwiched between two lens plates 521 and 522 arranged in a crossing state. Each of the two lens plates 521 and 522 of the uniform illumination optical system 523 is provided with a plurality of rectangular lenses arranged in a matrix.

The light emitted from the light source device 520 is separated to a plurality of partial lights by the rectangular lenses of the first lens plate 521.

Then, these partial lights overlap near the three light valves 525R, 525G, and 525B by the rectangular lenses of the second lens plate 522. Accordingly, by using the uniform illumination optical system 523, even in the case where the light source device 520 has a nonuniform illumination distribution in the cross-section of the emitted light, it becomes possible to illuminate the three light valves 525R, 525G, and 525B by uniform illumination light.

Each color separation optical system 524 is constituted by a blue green reflection dichroic mirror 541, a green reflection dichroic mirror 542, and a reflection mirror 543.

First, at the blue green reflection dichroic mirror 541, the blue light B and the green light G included in the light W are reflected at a right angle and proceed toward the green reflection dichroic mirror 542. The red light R passes through this blue green reflection dichroic mirror 541, is reflected at the backward reflection mirror 543 at a right angle, and is emitted from an emission portion 544 of the red light R to the prism unit 510 side.

Next, at the green reflection dichroic mirror 542, between the blue light B and the green light G reflected at the blue green reflection dichroic mirror 541, only the green light G is reflected at a right angle and emitted from an emission portion 545 of the green light G to the color combining optical system side. The blue light B passing through the green reflection dichroic mirror 542 is emitted from an emission portion 546 of the blue light B to the light guide system 527 side.

Here, the system is set so that the distances from the emission portion of the light W of the uniform illumination optical system 523 to the emission portions 544, 545, and 546 of the colored light in the color separation optical system 524 become substantially equal. On the emission side of the emission portion 544 of the red light R and the emission portion 545 of the green light G of the color separation optical system 524, a condenser lens 551 and a condenser lens 552 are arranged. Accordingly, the red light R and the green light G emitted from the emission portions strike these condenser lens 551 and condenser lens 552 so as to be made parallel.

The red light R and the green light G made parallel in this way strike the light valve 525R and the light valve 525G where they are modulated and added with image information corresponding to the colors. Namely, these liquid crystal display devices are controlled in response to the image information by a not shown driving means. Due to this, the colored light passing through them is modulated. On the other hand, the blue light B is guided via the light guide system 527 to the corresponding light valve 525B where it is modulated in response to the image information in the same way as the above.

Note that the light valves 525R, 525G, and 525B of the present example are liquid crystal light valves further including incident side polarizing means 561R, 561G, and 561B and liquid crystal displays 562R, 562G, and 562B arranged between them.

The light guide system 527 is constituted by a condenser lens 554 arranged on the emission side of the blue light B of the emission portion 546, an incident side reflection mirror 571, an emission side reflection mirror 572, an intermediate lens 573 arranged between these reflection mirrors, and a condenser lens 553 arranged in front of the light valve 525B.

The blue light emitted from the condenser lens 546 is guided via the light guide system 527 to the liquid crystal display 562B where it is modulated. Among the light path lengths of the colored light, that is, the distances from the emission portion of the light W to the liquid crystal display devices 562R, 562G, and 562B, the distance to the blue light B becomes the longest. Accordingly, the amount of loss of the blue light becomes the largest.

However, by interposing the light guide system 527, the loss of light can be suppressed. Color lights R, G, and B modulated by passing through the light valves 525R, 525G, and 525B strike the color combining prism 510 where they are combined.

Then, the light combined by the color combining prism 510 is enlarged and projected onto the surface of the projection screen 600 existing at a predetermined position via the projection lens unit 506.

Note that the above effects can be expected even when the present invention is applied not only to a simple matrix system but also to any other system of liquid crystal display device, such as a TFTF active matrix system, a TFD active matrix system, a passive matrix drive system, optical rotation mode, and birefringence mode. Further, the effects can be expected even when the liquid crystal injection device of the present invention is applied not only to a built-in drive type liquid crystal device, but also to a type of a liquid crystal display device with an externally attached drive circuit, liquid crystal display devices having a variety of sizes of a diagonal 1 inch to 15 inches or more and projection type liquid crystal display devices.

Note that the above effects are obtained even when the present invention is applied not only to a projection type liquid crystal display device but also any to other system of device such as a reflection type liquid crystal display device, LCOS, and organic EL.

Further, the above effects can be expected even when the present invention is applied to any system of liquid crystal display device, such as a built-in drive type liquid crystal display device, a type of a liquid crystal display device with an externally attached drive circuit, a simple matrix system, a TFD active matrix system, a passive matrix drive system, an optical rotation mode, and a birefringence mode.

INDUSTRIAL APPLICABILITY

The present invention can prevent the deterioration, etc. of a liquid crystal panel even when a liquid crystal panel used in a light valve of a projector or the like is operated under a high temperature and high humidity environment, and therefore it can be applied not only to a projection type liquid crystal display device but also to any other system of device, such as a reflection type liquid crystal display device, a LCOS, and an organic EL.

The invention claimed is:

1. A liquid crystal display comprising
two substrates on which alignment films for orienting liquid crystal in a predetermined direction are formed, the alignment films facing each other across a predetermined gap by a sealing material to bond the pair of substrates between which a liquid crystal layer is sandwiched, wherein
the sealing material contains a filler having a mean particle size of less than 0.5 μm and a maximum particle size of 1.5 μm or less,
the liquid crystal material used in the liquid crystal layer has a refractive index anisotropy at room temperature of 0.16 or more, and a cell mean gap is substantially 3 μm at a relative contrast ration of 1.

2. A liquid crystal display as set forth in claim 1, wherein the liquid crystal material used in the liquid crystal layer has a refractive index anisotropy at room temperature of 0.18 or more.

3. A liquid crystal display as set forth in claim 1, wherein the content of the filler contained in the sealing material is within a range of 15 to 40 wt %.

4. A liquid crystal display as set forth in claim 1, wherein a specific surface area of the filler contained in the sealing material is 30 m²/g or less.

5. A liquid crystal display as set forth in claim 4, wherein the alignment film material is an inorganic alignment film.

6. A liquid crystal display as set form in claim 1, wherein the alignment film material is an inorganic alignment film.

7. The projection type display apparatus as set forth in claim 1, further comprising:
a light source, a condensing optical system for guiding the light emitted from the light source to said liquid crystal display device, and
a projection optical system for enlarging and projecting light modulated by the liquid crystal display device.

* * * * *